United States Patent

Loeffler

[15] 3,654,976

[45] Apr. 11, 1972

[54] PEELING DEVICE

[72] Inventor: Louis H. Loeffler, 1247 Minerva Avenue, W. Islip, N.Y. 11795

[22] Filed: Feb. 26, 1970

[21] Appl. No.: 14,532

[52] U.S. Cl. ........................................146/49 B
[51] Int. Cl. ..............................................A23n 7/02
[58] Field of Search ......................146/49 B, 50 A

[56] References Cited

UNITED STATES PATENTS

| 1,886,061 | 11/1932 | Speidel | 146/50 A |
| 1,939,847 | 12/1933 | Greist et al. | 146/69 B |

FOREIGN PATENTS OR APPLICATIONS

| 248,953 | 1/1964 | Australia | 146/50 A |
| 666,271 | 2/1952 | Great Britain | 146/50 A |

*Primary Examiner*—Willie G. Abercrombie
*Attorney*—Bauer & Amer

[57] ABSTRACT

A vegetable peeling device including a pot-like housing unit effectively containing a rotary and a relatively stationary cooperating arrangement of peeling members, wherein the drive for said rotary member is readily completed when said unit is placed in a seated position on a stand, and yet said unit is readily movable from said stand, for transport to a work or cleaning station.

9 Claims, 1 Drawing Figure

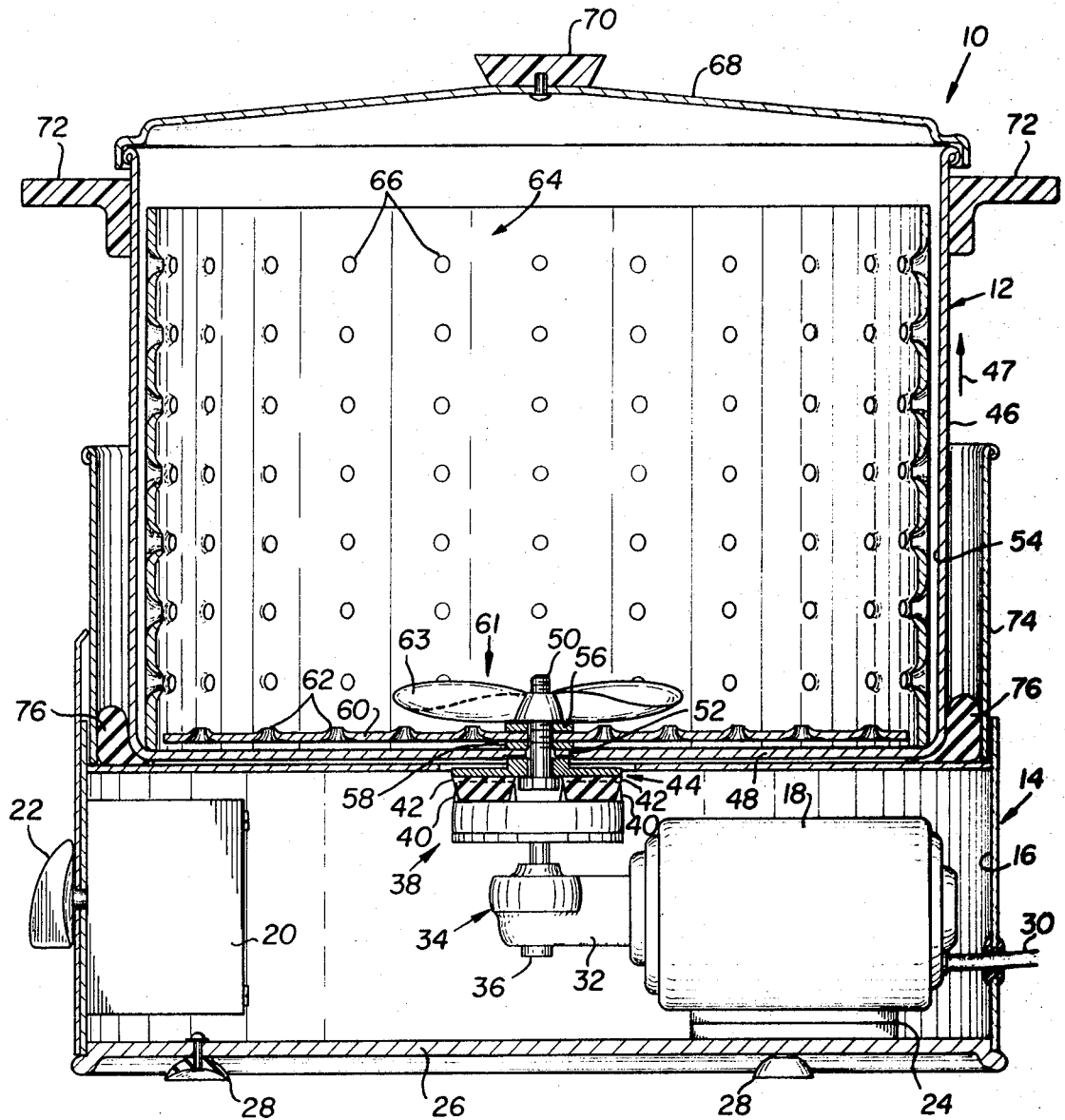
PATENTED APR 11 1972        3,654,976
INVENTOR
LOUIS H. LOEFFLER
BY Bauer & Ames
ATTORNEY

PEELING DEVICE

The present invention relates generally to vegetable peeling devices, and more particularly to an improved peeling device having a desirable degree of mobility which greatly facilitates its use in that it is readily transportable to a remote work or cleaning station.

As can be readily appreciated, the peeling operation of a vegetable peeling device must, of necessity, result in an accumulation of peeled skins and the like within the device. These skins must be removed in order not to interfere with subsequent use of the device. Moreover, the peeling station is not always a convenient station for effecting this cleaning, nor is it always a convenient work station for the peeled contents. Accordingly, it is desirable that the peeling device, or at least the peeling mechanism or parts thereof, be readily transportable.

In known devices, however, the peeling action is provided by a rotary peeling member which requires powering by a motor and which therefor complicates rendering the device portable. In those models in which the powering motor is a permanently attached part of the device, the motor weight is, of course, a factor which detracts from portability; and in models where the motor drive can be disconnected or decoupled, the known decoupling techniques are unduely complicated.

Broadly, it is an object of the present invention to provide an improved vegetable peeling device overcoming the foregoing and other shortcomings of the prior art. Specifically, it is an object to provide a two-part peeling device, one part of which contains the peeling members and the peeled contents, which results from a typical interval of use, and is readily transported to a remote cleaning or work station.

An improved vegetable peeler demonstrating objects and advantages of the present invention includes a stand serving as a housing for a motor and also as a support for the operable parts of the device. These operable parts are a cooperating arrangement of stationary and rotary abrading-surfaced peeling members, the latter being mounted on a depending driven shaft which extends into the motor compartment and into position adjacent a motor driving shaft. Completing the drive connection between the driven and driving shafts is a clutch having cooperating depending and upstanding clutch teeth effective to transmit rotary power when assuming an intermeshing relation. This intermeshing relation occurs in the seated position of the housing for the operable parts upon its support stand, which position does not impede the housing being readily removed from the support stand and transported to a remote location.

The above brief description, as well as further objects, features and advantages of the present invention, will be more fully appreciated by reference to the following detailed description of a presently preferred, but nonetheless illustrative embodiment in accordance with the present invention, when taken in conjunction with the accompanying drawing.

In the drawing there is shown a side elevational view, in section, of a peeling device for vegetables and the like according to the present invention.

The peeling device, generally designated 10, includes a pot-like outer housing unit 12 which, during peeling operation, occupies a seated position on a support stand 14 located on an appropriate support surface. After peeling operation, outer unit 12 is readily removed from the stand 14 to be taken to a more convenient location in the kitchen or other place where it is used, where the peeled contents thereof are removed and where, also, the device 10 can be cleaned. As can be readily understood, the peeling operation of the device 10, of necessity, must result in an accumulation of the peeled skins of the vegetables within the housing unit 10 which must be removed in order not to interfere with subsequent use of the device. It is, therefore, a significant feature of the device 10 that the operable parts that contribute to the peeling action thereof are readily removable with the outer housing 12 to an appropriate cleaning station.

Turning now to details in the construction of the device 10, the previously noted support stand 14, in the illustrated embodiment, bounds a motor compartment 16 which houses, at one end, a motor 18 and, at an opposite end, an electrical control 20 having an accessible outer dial 22, which, in a well understood manner, is effective in starting and terminating the operation of the motor 18 as well as determining its speed and/or period of operation as may be required to provide proper peeling action for the various types of vegetables to be peeled within the device 10. For example, the peeling of potatoes would require a more vigorous peeling action than would the peeling of tomatos or similar fragile foods.

Motor 18 is appropriately mounted, as at 24, to the compartment bottom wall 26 which has suction cups 28 depending therefrom which are adapted to firmly engage the support surface to hold the device 10 in place despite unavoidable vibrations which occur in the device 10 during its peeling operation. Electrical conductors 30 are threaded through the stand 14 to one side of the motor 18. From the opposite motor side, there extends a driving motor shaft and housing 32 which is connected by appropriate gearing, such as a pinion and worm gear arrangement 34, to the depending end of an upstanding or vertically oriented driven shaft 36. One of two cooperating clutch elements, generally designated 38, is fixedly connected to the other upper end of the driven shaft 36. The significant structural feature of clutch element 38 is its upstanding circumferential arrangement of clutch teeth 40 which are effective in transmitting rotational power such as is necessary for producing a peeling action within the outer housing unit 13. At the same time, use of the clutch teeth 40 readily permit the user to disconnect the drive incident to the moving of the unit 12 from the stand 14 for cleaning and other such purposes, as has already been noted.

Specifically, rotational power of the motor 18 which, as already noted is transmitted to the clutch element 38, and more particularly to the clutch teeth 40 thereof, is transmitted via a cooperating pair of depending clutch teeth 42 of the other clutch element 44 which is movable with the peeler or unit 12. That is, the drive between the clutch elements 38 and 44 is achieved through an intermeshing relation of the teeth 40 and 42 in the plane of the teeth. Yet, vertical or lifting movement 47 of the unit 12 from the stand 14 is not in any way impeded or prevented by the intermeshing drive connection of the teeth 40 and 42.

Turning now to the construction of the unit 12, the same includes a cylindrical side wall 46 and a bottom wall 48. Rotating in unison with clutch element 44 is a connector or bolt 50 connected at one end to the clutch element 44 and extending upwardly through a central opening 52 in the bottom wall 48 and actually into the peeling compartment 54 which is bounded by the outer housing unit side and bottom walls 46 and 48, respectively. Just beyond the projection of the bolt 50 through the opening 52, there is an arrangement of plastic, preferably Teflon, washers 56 and 58 and a sandwiched rotary peeling member 60 therebetween having projecting elements 62. A cooperating connector 61, having a propeller-like body 63, the functioning of which will soon be described, is threadably engaged to the upper end of the bolt 50 and, when tightened, is effective in causing the frictional engagement of the peeling member 60 between the washers 56 and 58 to the extent that the peeling member 60 is driven in rotation with the cooperating bolt 50 and connector 61. In this manner, the rotation imparted to the depending clutch teeth 42 is transmitted to the rotary peeling member 60 occupying a clearance position adjacent the bottom of the outer housing unit 12. Since member 60 will be understood to be an abraiding-surfaced element, as at 62, the rotation thereof functions in a well-understood manner to contribute to the abrading and to the peeling of vegetables or the like placed within the unit 12.

Cooperating with the rotary peeling member 60 is a stationary, cylindrical open-ended peeling member 64 which is disposed within the peeling compartment 54 in a slight clearance position from the unit side wall 46. The stationary peeling member 64, like the member 60, has an appropriate abrading-surfaced construction, as at 66, and cooperates with the rotary member 60 in providing effective peeling action of the vegetable contents placed within the peeling compartment 54.

Completing the construction of the housing unit 12 is a cover 68 having a central hand grip 70. Side hand grips 72 are also mounted directly on the outer housing unit 12 to facilitate lifting in the direction of arrow 47 and removal of the unit from the support stand 14.

From what has already been said, it should be readily appreciated that it is during the return of the unit 12 on the support stand 14 that the intermeshing relationship of the teeth 40 and 42 are again established in order that the motor 18 is connected to power the rotary peeling member 60 in rotation. To facilitate achieving the proper seated position of the unit 12 on the stand 14, there is provided an upstanding guiding cylinder 74 within which the unit 12 is centrally located during seating on the stand 14 and which, when centrally located, assures that clutch teeth 40 and 42 are vertically aligned with each other so as to provide the necessary intermeshing relationship of these teeth.

The guide 74 also functions effectively as a retaining wall for a force or vibration absorbing member as the elastomeric ring-like member 76 on which the unit 12 actually seats in its operative position on the stand 14. The vibration absorbing elastomeric ring 76 has been found to function very effectively as a shock absorber for the vibrations induced in the device 10 during its peeling operation. It also functions as a seat and guide for the proper positioning and retention of the unit 12 during operation.

Another feature which contributes to the effective functioning of the device 10 is the previously noted propeller-like body 63 of the connector 61. As a result of its shape, the rotating body 63, functioning somewhat like a propeller, is effective in causing movement of the vegetable contents within the peeling compartment 54. This additional movement induced in the vegetable contents is helpful in exposing different areas of the vegetables to the peeling members 60 and 64 and their abrading surfaces, as well as minimizing the possibility of jamming which could result when vegetables, like potatoes, wedge themselves between the lower portion of the member 64 and the upstanding connector 50. Rotation of the propeller-like body 63 effectively clears this area of such wedging vegetables and prevents such wedging from occurring.

From the foregoing, it should be readily appreciated that there has been described an effectively and efficiently functioning peeling device 10 which has a substantially fluid-tight outer housing unit 12 to house vegetables and the like to be peeled and within which the usual amount of water or other such fluid to lubricate can be placed to thereby facilitate the peeling action. Not only are all the food contents effectively contained within the unit 12, but this unit also houses the structural features which contribute to the peeling action of the device, such as the stationary and rotary peeling members 64 and 60, respectively. As a consequence, merely upon the removal of the unit 12 from the support stand 14, it is readily possible to transport the peeling members 64 and 60 to a cleaning station where the peels, vegetable skins and the like are readily cleansed from these members and thus removed from within the peeling compartment 54. Although, in practice the member 64 has been secured as an integral part of the compartment wall 54, it has been found that such securement is not necessary and the member 64 may be left in a free standing or in a restricted position relative to such wall and rotating member 60.

A latitude of modification, change and substitution is intended in the foregoing disclosure, and in some instances some features of the invention will be employed without a corresponding use of other features.

What is claimed is:

1. A peeling device for vegetables and the like comprising a support stand defining a motor compartment, a substantially fluid-tight outer housing unit including side and bottom walls bounding an internal peeling compartment, a stationary circular abrading-surfaced peeling member terminating in an open bottom disposed within said peeling compartment, a rotary abrading-surfaced peeling member in said compartment and disposed in a clearance position adjacent said open bottom, an upstanding driven shaft operatively connected adjacent its upper end to said rotary peeling member and sealingly extended through said bottom wall of said outer housing unit into said motor compartment including a driving shaft having an end in adjacent position to said depending end of said driven shaft, a clutch operatively arranged to complete the driving connection between said driven and driving shafts including cooperating depending and upstanding clutch teeth having a rotary driving relation incident to relative vertical movement thereof into an intermeshing relation, and said unit including said circular and rotary peeling members having an operative supported position on said stand and movable through a vertical lifting movement from said stand to remove said unit from said stand to provide for cleaning access thereto and to said clutch.

2. A peeling device for vegetables and the like as defined in claim 1 including an elastomeric member in an interposed position between said stand and said outer housing unit effective to absorb the vibrations of peeling operation of said device.

3. A peeling device for vegetables and the like as defined in claim 1 including an upstanding guide on said stand in close surrounding relation to said outer housing unit effective to guide said outer housing unit into proper seated position on said stand resulting in intermeshing relation of said clutch tooth members.

4. A peeling device for vegetables and the like as defined in claim 3 including a connector operatively arranged on said upper end of said driven shaft extending within said peeling compartment to complete said connection of said rotary peeling member on said driven shaft, said connector having a propeller-like body.

5. A peeling device for vegetables and the like comprising a support stand defining a motor compartment, a substantially fluid-tight outer housing unit removably supported on said stand, a cooperating arrangement of stationary and rotary peeling members disposed within said housing, driven means extending through said housing and connected with said rotary peeling member in said housing with driven clutch means beyond said housing, driving means within said motor compartment including a driving clutch means operatively effective to engage said driven clutch means to cause the powering of said rotary peeling member in rotation incident to the placement of said outer housing unit in said operative supported position on said stand, an upstanding guide in close surrounding relation to said outer housing unit effective to guide said outer housing unit into an operative supported position on said stand, an absorptive member in an interposed position between said stand and said outer housing unit effective to absorb the vibrations of peeling operation of said device, and said housing being free for vertical lifting movement from said absorptive member and relative to said upstanding guide to remove said housing, peeling members, driven means and its respective clutch means and for free lowering guided movement relative to said upstanding guide, said absorptive member and to engage said driven clutch means with said driving clutch means.

6. A peeling device for vegetables and the like as defined in claim 5 wherein said clutch means includes cooperating depending and upstanding clutch teeth having an intermeshing relation preparatory to the functioning of said clutch means to cause the powering of said rotary peeling member in rotation.

7. A peeling device for vegetables and the like as defined in claim 5 wherein said outer housing unit has a substantial circular side wall and a transverse bottom wall, and said stationary peeling member is an open-ended circular shape disposed in a standing position within said outer housing unit on said bottom wall thereof.

8. A peeling device for vegetables and the like as defined in claim 7 wherein said rotary peeling member is disposed in a clearance position within said stationary peeling member adjacent the bottom opening thereof.

9. A peeling device for vegetables and the like as defined in claim 8 including an upstanding shaft mounting said rotary peeling member adjacent an upper end and sealingly extended through said bottom wall of said outer housing unit into said motor compartment of said stand for connection to said clutch means.

* * * * *